(12) United States Patent
Sonabend et al.

(10) Patent No.: US 9,684,971 B2
(45) Date of Patent: Jun. 20, 2017

(54) FIELD GOAL INDICATOR FOR VIDEO PRESENTATION

(71) Applicant: PRESENCIA EN MEDIOS SA DE CV, Naucalpan (MX)

(72) Inventors: Roberto Sonabend, Bosques de Las Lomas (MX); Jose Luis Almeida, Bosques de Las Lomas (MX)

(*) Notice: Subject to any disclaimer, the term of this patent is extended or adjusted under 35 U.S.C. 154(b) by 242 days.

(21) Appl. No.: 14/442,879

(22) PCT Filed: Nov. 13, 2013

(86) PCT No.: PCT/US2013/069861
§ 371 (c)(1),
(2) Date: May 14, 2015

(87) PCT Pub. No.: WO2014/078392
PCT Pub. Date: May 22, 2014

(65) Prior Publication Data
US 2015/0296272 A1    Oct. 15, 2015

Related U.S. Application Data

(60) Provisional application No. 61/726,117, filed on Nov. 14, 2012.

(51) Int. Cl.
*H04N 7/18* (2006.01)
*G06T 7/20* (2017.01)
(Continued)

(52) U.S. Cl.
CPC ........... *G06T 7/2093* (2013.01); *A61H 99/00* (2013.01); *A63B 71/0605* (2013.01);
(Continued)

(58) Field of Classification Search
IPC .................................................. G06T 7/2093
See application file for complete search history.

(56) References Cited

U.S. PATENT DOCUMENTS 5,264,933 A    11/1993   Rosser et al.
7,341,530 B2   3/2008    Cavallaro et al.
(Continued)

FOREIGN PATENT DOCUMENTS

EP    0835584 B1    5/2004

OTHER PUBLICATIONS

PCT International Search Report and Written Opinion, Mar. 20, 2014.

*Primary Examiner* — Tracy Y Li
(74) *Attorney, Agent, or Firm* — r.r (princeton); Roy Rosser (57) ABSTRACT

A method is described for indicating an outcome of a sports action by determining a trajectory of a game-object. In football, the trajectory of the football determines the outcome of a field goal attempt. A television viewer has difficulty seeing if the ball passes between the uprights or not, especially if the ball is kicked higher than the uprights. By tracking the trajectory, virtual insertions such as extended goal posts, or goal posts colored to reflect the success or not of the attempt, can be inserted in a video feed. By tracking the flight of the ball from the time it is set in motion, the balls future trajectory is predicted after a short elapsed time, and the television audience is informed of the outcome before it has happened.

4 Claims, 4 Drawing Sheets

(51) Int. Cl.
*A61H 99/00* (2006.01)
*A63B 71/06* (2006.01)
*H04N 5/232* (2006.01)
*H04N 21/81* (2011.01)
*H04N 5/272* (2006.01)

(52) U.S. Cl.
CPC ......... *H04N 5/23229* (2013.01); *H04N 5/272* (2013.01); *H04N 21/8133* (2013.01); *G06T 2207/10016* (2013.01); *G06T 2207/30224* (2013.01); *G06T 2207/30241* (2013.01)

(56) References Cited

U.S. PATENT DOCUMENTS

| | | | |
|---|---|---|---|
| 2004/0180709 A1* | 9/2004 | Takahashi | A63F 13/10 463/3 |
| 2008/0312010 A1 | 12/2008 | Marty et al. | |
| 2009/0060352 A1* | 3/2009 | Distante | A63B 24/0021 382/224 |
| 2009/0262137 A1 | 10/2009 | Walker et al. | |
| 2010/0026809 A1* | 2/2010 | Curry | H04N 5/222 348/157 |
| 2012/0120201 A1* | 5/2012 | Ward | G06T 19/006 348/47 |
| 2013/0120581 A1* | 5/2013 | Daniels | G06K 9/00724 348/157 |

* cited by examiner

FIELD GOAL INDICATOR FOR VIDEO PRESENTATION

CLAIM OF PRIORITY

This application is a National Stage Application under 35 USC Section 371 of PCT application PCT/US2013/069861 and claims priority both to that PCT application and to U.S. Provisional Patent Application No. 61/726,117 filed on Nov. 14, 2012 the contents of both of which are fully incorporated herein by reference.

TECHNICAL FIELD

The invention relates to video special effects, and more particularly to virtual graphics enhancements to video images to reflect the outcome of an on-screen action, such as, but not limited to, visual indicators of the success or failure of a field goal attempt in a televised football broadcast.

BACKGROUND ART

The virtual 1st down marker is a line that exists only in the video field and is placed there using a sophisticated combination of digital blue screen technology and pattern recognition technology. The line has become a regular feature of television broadcasts of football in the USA and has been widely praised as adding value to the broadcast. Broadcasters and football teams are, therefore, desirous of adding other similar graphic enhancements to their broadcasts using the same or similar technology.

One situation that is of interest is the field goal attempt in American football. The object is for the kicker to kick the ball above the cross bar and between the uprights of a goal post, one of which is situated at each end of the field of play.

Because of the small size of the ball compared to the goal post uprights, it is difficult to discern whether an attempt has been successful or not from merely watching the broadcast video.

This problem is exacerbated when the ball is kicked so high that passes above the height of the goal post uprights. In principle, the uprights are deemed, for the purpose of determining success or not of a kick, to be infinitely long. Real goal posts are finite in height, and a kick that sends the ball higher than the uprights makes it that much more difficult for a television viewer to discern success or not.

The present invention solves these problems by actually measuring the trajectory of the ball and inserting appropriate indicia of success or failure, such as, but not limited to, coloring the goal posts green for success and red for failure. The present invention also provides methods of predicting the trajectory of the football so that indicia of success or failure may be inserted prior to the football passing the plane of the goal post up-rights.

DESCRIPTION OF THE RELATED ART

The relevant prior art includes:

U.S. Pat. No. 5,264,933 issued to Rosser, et al. on Nov. 23, 1993 entitled "Television displays having selected inserted indicia" that describes an apparatus and method of altering video images to enable the addition of images, message, slogans or indicia in such a manner that they appear to be part of the original image as displayed. The application of the apparatus and method is particularly adapted to be used as advertising during sporting events or other events whereby an operator selects a portion of the video image display such as a portion of a tennis court, recognizes the selected portion and inserts a logo or advertising message into that selected portion. The message is inserted into the selected portion of the court independent of how the scene is being panned or viewed by the television camera. The apparatus employs a pattern recognition algorithm such as the Burt Pyramid Algorithm to recognize the specific selected image portion and by means of the image processor substitute the logo into the first image (16) to provide a display which appears as if the inserted image was actually painted on or otherwise permanently positioned on the court. Thus the inserted images are seamlessly and realistically incorporated into the original even as the original scene is moved, panned, magnified, zoomed or otherwise altered in size or perspective. The resulting composite image appears to the television viewer to be absolutely real and present at the scene.

U.S. Pat. No. 8,136,133 issued to Walker, et al. on Mar. 13, 2012 entitled "Methods and systems for broadcasting modified live media" that describes methods and systems for broadcasting a modified live media feed of an event. In an embodiment, the method includes receiving a live media feed at a broadcast computer from one or more recording devices, wherein the live media feed includes real time occurrences of a live event. The live media feed is broadcast after a predetermined delay, and the method includes identifying, during monitoring of the live event, a portion of the live event that is suitable for application of a modification effect. The process also includes the broadcast computer applying the modification effect to a portion of the live media feed corresponding to the identified portion of the live event, and then broadcasting the modified live media feed.

U.S. Pat. No. 7,341,530 issued to Cavallaro, et al. on Mar. 11, 2008 entitled "Virtual strike zone" that describes a system that adds a graphical image of the strike zone to a video or other image of a baseball game. The system determines location of the strike zone and the ball in real space. The locations of the strike zone and the ball are depicted in the video. Based on knowing the locations of the strike zone and the ball, the system can determines whether the pitch was a strike or a ball.

U.S. Pat. No. 6,750,919 issued to Rosser on Jun. 15, 2004 entitled "Event linked insertion of indicia into video" that describes a system and method for placing event related information into a video broadcasting so that the added information does not interfere with or obscure the primary action of interest in the broadcast. The disclosed information could be implemented by using instructions from an event information gathering system to trigger the display of one of an appropriate set of pre-rendered animations in the broadcast video via a well-known live video insertion system. The disclosed invention envisages the animation sequence having at least two parts, namely a core or base sequence which is always used, and a mid or a variable sequence which is changed according to the actual data that needs to be displayed. The live video insertion system data and processing may be used to perform occlusion, and/or tracking to either make the event information display look as if it is part of the scene, or merely to occlude the display when event action would otherwise be obscured, or to turn off or reposition, or resize the display when event action otherwise be obscured.

Various implements are known in the art, but fail to address all of the problems solved by the invention described herein. Various embodiments of this invention are illustrated in the accompanying drawings and will be described in more detail herein below.

DISCLOSURE OF INVENTION

The present invention provides methods and systems for, on a television broadcast of an event, indicating an outcome of a sports action by determining a trajectory of a game-object relative to a fixed, reference object.

The system may, for instance, be applied to an event such as, but not limited to, American football. In such an application, the game object may be a football, while the sports action may be a field goal attempt. By tracking the trajectory of the football, it may be possible to determine whether or not the football passed over the cross-bar and between the uprights, thereby determining whether or not the attempt was successful. Indicia may then be inserted virtually on the video image that may be indicative of the outcome. This may, for instance, take the form of a transformation such as, but not limited to, having the goal posts look as if they are flashing green lights for a success, and flashing red lights for a failure.

In a preferred embodiment, the method of the present invention begins tracking the flight of the game object from the time it is set in motion. By doing this, it may be possible to predict the objects trajectory, including the effects of currently prevailing winds, and use this information to determine the outcome of the event prior to its completion. In this way, the television audience may be informed of the outcome of an attempt before it has actually happened.

In a further preferred embodiment of the invention, the determination and/or prediction of the trajectory may be accomplished using only two cameras, that may be still cameras, placed at appropriate positions. Using a technique such as, but not limited to, pattern recognition, to obtain three dimensional positional information, and knowing the elapsed time at which this information was obtained along with factors such as, but not limited to, or necessarily including, the footballs weight, its prior observed behavior, a measurement of the air currents in the stadium and prior knowledge of the effect of such air currents, or some combination thereof, it may be possible to accurately predict the future trajectory of the game object.

In yet a further preferred embodiment of the invention, in the situation where the football in a field goal attempt is kicked higher than the top of the goal post uprights, the virtual indicia inserted may have the effect of making the goal posts appear to the television viewer to grow to a height that may exceed the maximum height of the trajectory of the football. Using the prediction capability described above, these increased height goal posts may be made to appear prior to the football reaching the plane of the uprights.

Therefore, the present invention succeeds in conferring the following, and others not mentioned, desirable and useful benefits and objectives.

It is an object of the present invention to provide a television viewer a graphic indication of the outcome of an event action.

It is another object of the present invention to provide video viewers enhanced feature of a playing field in order to make the outcome of an event action more clearly observable.

Yet another object of the present invention is to provide a trajectory projection that allows the television viewer to see the outcome of an event action before the action is completed.

Still another object of the present invention is to provide the trajectory predicting system in a cost effect way and/or with a minimum of additional equipment.

BEST MODE FOR CARRYING OUT THE INVENTION

The best mode for carrying out the present invention will now be described with reference to the drawings. Identical elements in the various figures are identified with the same reference numerals.

Reference will now be made in detail to embodiments of the present invention. Such embodiments are provided by way of explanation of the present invention, which is not intended to be limited thereto. In fact, those of ordinary skill in the art may appreciate upon reading the present specification and viewing the present drawings that various modifications and variations may be made thereto.

Figure 1:
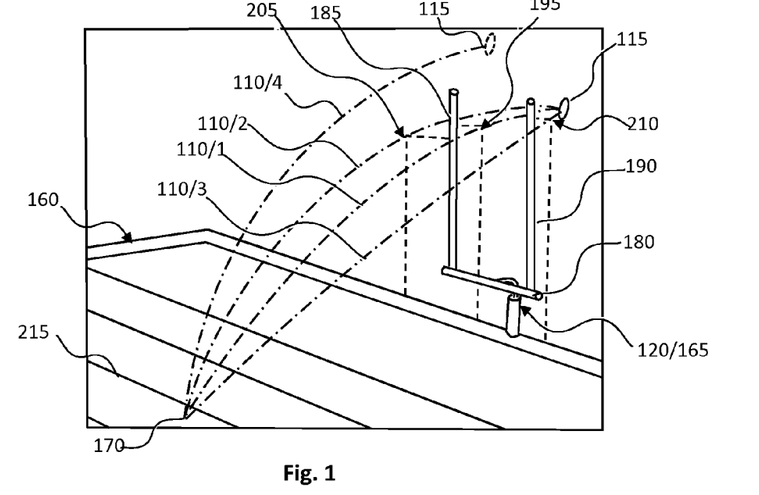
FIG. 1 shows a schematic of a video image of a football field goal attempt.

FIG. 1 shows a schematic drawing of a video image 150 of a number of football field goal attempts as indicated by the trajectory 110 of a football 115. The image 150 of the football field goal attempt may be framed to show all or a portion of a playing field 160, the football goalpost 165 and a starting point 170 of the field goal attempt. The image 150 may also show game markings 215 on the playing field 160.

Four trajectories 110 of a football 175 in a field goal attempt are shown in FIG. 1.

A first trajectory 110 may be a successful field goal 1. The reason it may be successful is that the trajectory 110 of the football 175 passes over a crossbar 180 and between a left upright 185 and a right upright 190 of the football goalpost 165. This may be defined as the "game rule" for football field goals. This game rule may, for instance, be expressed as requiring that the trajectory 110 has a point of intersection with an imaginary plane which may be deemed to be a successful point of intersection 195 if that point of intersection lies within the bounds of the imaginary, infinite rectangle formed by the crossbar 180 and the left and the right uprights 185/190 extended to infinity above the crossbar 180.

A second trajectory 110 may be an unsuccessful field goal attempt 2. In unsuccessful field goal attempt 2, the trajectory 110 of the football 175 passes to the left of the left upright 185 as seen by a point of intersection 205 that lies outside of the imaginary rectangle described above.

A third trajectory 110 may also be an unsuccessful field goal attempt 3. In unsuccessful field goal attempt 3, the trajectory 110 of the football 175 passes to the right of the right upright 190 as seen by a point of intersection 210 that lies outside of the imaginary rectangle described above.

A forth trajectory 110 may be an out-of-range field goal attempt 4 that television viewers may find very difficult to decide if it has been successful or not. In out-of-range field goal attempt 4, the football 175 has been kicked so that high that it is above the top of the goalpost uprights 185 and 190. A television viewer of the broadcast may, therefore, have difficulty determining whether or not the trajectory passes through the imaginary, infinite rectangle formed by the crossbar 180 and the left and the right uprights 185/190 extended to infinity above the crossbar 180.

Figure 2:
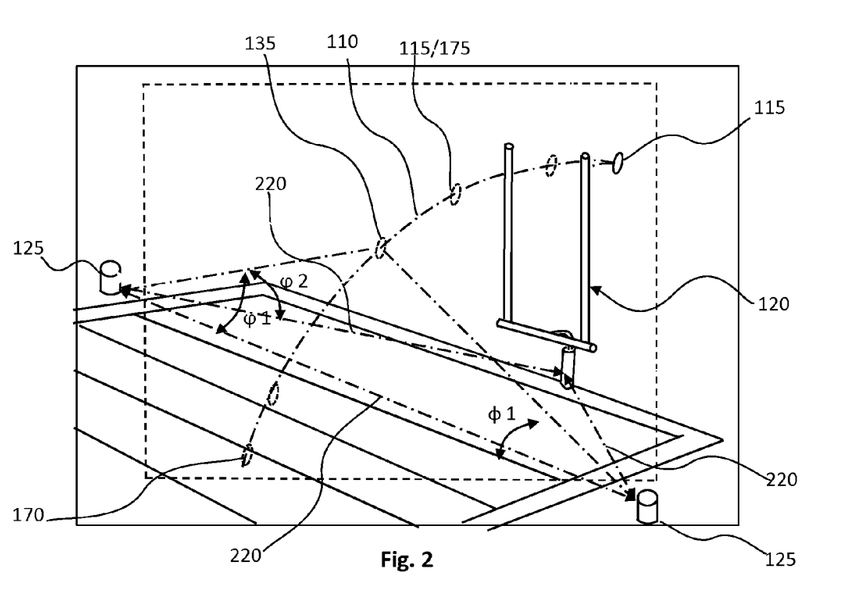
FIG. 2 shows a schematic of a football field goal attempt being observed in accordance with the inventive concepts of the present invention.

FIG. 2 shows a schematic view of a football field goal attempt being observed in accordance with the inventive concepts of the present invention.

In a preferred embodiment of the present invention the trajectory 110 of a game-object 115 may be determined using two or more detectors 125. The detectors 125 may be, or incorporate, any suitable method of determining the current bearings 130 to the game-object 115 that in this example may be the football 175. Such detectors 125 include, but are not limited to, cameras using pattern recognition, cameras fitted with pan, tilt and zoom motion sensors, directional radar, directional sonar, or some combination thereof. If the event allows modifications to the game-object 115, the detectors may further include, but are not limited to, the combined use of radio or infra-red light transmitters attached to, or concealed in, the game-object 115 and radio or infra-red directional receivers, the combined use of one or more retro-reflecting mirrors attached to the game-object 115 and two or more infra-red or visible light lasers and photo-detectors, or some combination thereof.

One method of using such detectors 125 to determine a trajectory 110 of a game-object 115 may be to initially determine the distance and bearing 220 of the detectors 125 to each other, and of each to a fixed, reference object 120 that may, for instance, be a football goalpost 165. Having established these known distances and bearings 220, the detectors may then be used, preferably in real-time, to obtain the current bearings 130 to the game-object 115 from each detector 125. Relevant angles are shown in FIG. 2 the angles labeled by the symbols $\phi 1$, $\phi 2$, $\phi 1$ and $\phi 2$.

Knowing these angles and bearings it is a matter of well-known trigonometry to obtain the current position 135 of the game-object 115 relative to the fixed, reference object 120 in 3-D space. By obtaining the current position 135 at two or more points during the flight of the game object, a trajectory may be determined by fitting a known mathematical function to the measured points and/or to interpolated intermediary points. Most currently available computers, or other analogue or digital calculating devices, may be readily programmed by one of ordinary skill in the art to automatically perform such calculations, and given appropriate input data, may perform such calculations in real-time.

Such a system may also be used to predict the future trajectory based on measurements of a first portion of the trajectory. The system may, for instance, track the trajectory of the game-object 115 from the starting point 170 up to the current position 135. Having obtained one or positions of the game along the initial portion of the trajectory, the system may then fit a known mathematical function to the partial trajectory and obtain a predicted, complete trajectory. Once the system has enough information to predict remainder of the trajectory 110 to within acceptable limits, the system may issue a signal specifying whether indicia of success or failure should be inserted into the video images intended for broadcast. Acceptable limits may be defined by a number such as, but not limited to, the percentage chance that at the plane of the goal post, the football will pass within the imaginary rectangle described above, i.e., the infinite rectangle bounded at the bottom by the crossbar 180, to the left by the left upright 185 extended upward to infinity, and the right upright 190 also extended upward to infinity. The system may, for instance, be programmed to issue a decision when that percentage chance reaches a predetermined threshold such as, but not limited to, a 90% chance. In major games, the threshold may be made higher and be 95% or in a Super Bowl Game as much as 99%. In college game, however, the threshold may be lower, may be as low as 80% chance. The advantage of predicting the outcome early is that the director may cut away from the shot of the field goal attempt as soon as the indicia appear or are otherwise activated. The advantage of cutting away sooner, before the touch judges have delivered their verdict, is that the director may have more opportunity for cutting to other shots that may be of more interest, or make for more compelling television, such as, but not limited to, reaction shots of the fans or the players.

Figure 3:
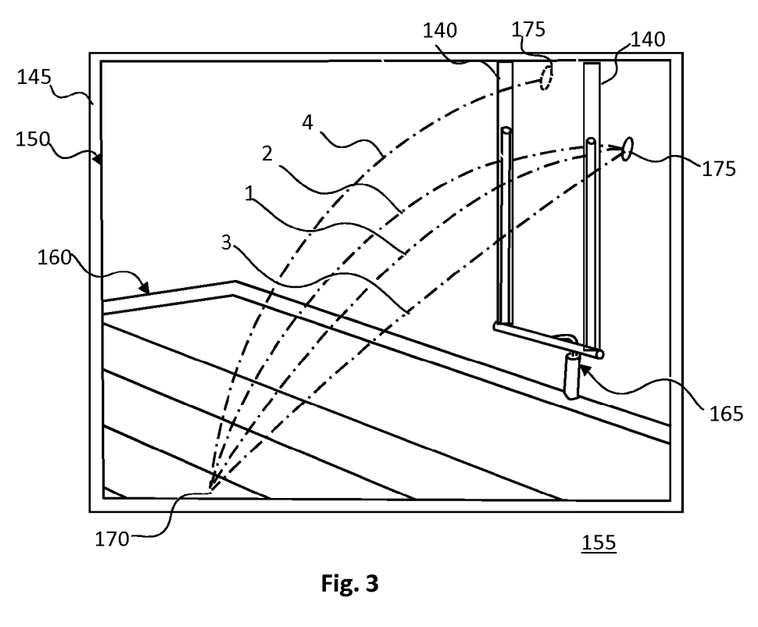
FIG. 3 shows a schematic of a video image of a football field goal attempt augmented in accordance with the inventive concepts of the present invention.

FIG. 3 shows a schematic of a video image of a football field goal attempt augmented in accordance with the inventive concepts of the present invention.

FIG. 3 shows a video display 145 such as, but not limited to, a television, a laptop, a tablet, or a smartphone, displaying an image 150 of a football field goal attempt 155. The image 150 may show a scene that includes elements such as, but not limited to, the playing field 160, the football goalpost 165 and the starting point 170 of the attempt, i.e., the point from which the football 175 will be kicked. The image 150 in FIG. 3 is shown overlaid with trajectories that have different outcomes.

In successful field goal trajectory 1, the football 175 passes between the uprights of the football goalpost 165 and above the cross-bar. On determining, or predicting such a trajectory, the system of the present invention may send a signal to a virtual video insertion engine to insert or activate appropriate indicia. Virtual video insertion systems are well-known in the broadcast industry and include systems deployed by SportVision, Inc. of Chicago, Ill. Such systems may operate using technologies such as, but not limited to, pattern recognition, camera motion detection or a combination thereof.

The insertions may, for instance, include indicia 140 indicative of the outcome such as, but not limited to, graphics, animations or video elements, showing goal-posts that may change color, that may flash, that may rise up or shrink down.

The field goal attempts shown by trajectories 2 and 3 are both unsuccessful, though indifferent ways. The unsuccessful field goal attempt 2, for instance, passes to the left of both the football goalpost 165 uprights. This may, for instance, be indicated by a virtual action such as, but not limited to, the left hand upright being made to appear red, or both uprights being red but only the left one flashing. One of ordinary skill in the art will appreciate that the ways of indicating success or failure may, essentially, only be limited by the creative imagination of the system operators or programmers.

The field goal attempt shown by trajectory 4 may be an out of range field goal attempt 4 in which the football 175 passes the football goalpost 165 above the height of the uprights. When the system of the present invention predicts, or detects, such a trajectory, the indicia 140 indicative of the outcome may be graphics, animations or video elements that make the uprights appear to extend upward in height to at least the actual or predicted height of the football as it passes over the goalpost. As one of ordinary skill of the art of virtual insertions in a broadcast will be aware, a virtual insertion engine typically has a pipeline of from one to 5 frames of digital video being processed. The system may, therefore, even in an embodiment lacking predictive capability, insert the indicia into the video stream in a manner that may appear to the viewer, to be going back in time, i.e., although the determination of the trajectory is actually made after the football has passed the line of the uprights, the virtual, extended uprights may be inserted upstream in the video pipeline, and may include the correct occlusion for the determined trajectory.

In the out of range field goal attempt 4, the extended goal posts may further be made to change color, flash or otherwise be animated to show success or failure of the attempt.

Figure 4:
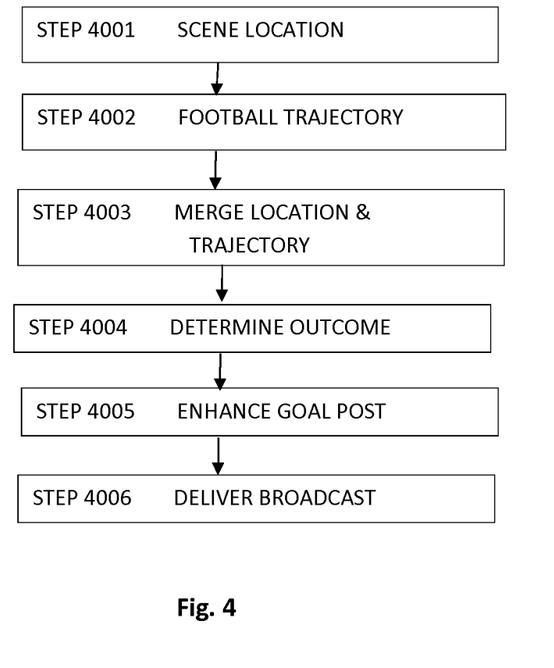
FIG. 4 shows a schematic flow diagram of possible steps in the method of the present invention.

FIG. 4 shows a schematic flow diagram of possible steps in the method of the present invention.

In step 4001, scene location, the elements of the scene that will appear on the broadcast camera may be captured and stored in memory for use. For instance, elements such as, but not limited to, the playing field, the markings on the field, the goal posts, may be captured on video from the broadcast camera and stored as reference frames, or be analyzed automatically by pattern recognition algorithms and the results stored, or some combination thereof.

In step 4002, football trajectory, the trajectory of an actual field goal attempt may be predicted or determined using methods such as, but not limited to, those described above or below.

In step 4003, the football trajectory and the scene may be mathematically merged, i.e., the trajectories appearance relative to the elements in the scene as currently being obtained by a broadcast camera, may be calculated. Such calculations are well-known in the art and are described in greater detail in, for instance, U.S. Pat. No. 6,750,919 issued to Rosser on Jun. 15, 2004 entitled "Event linked insertion of indicia into video", the contents of which are hereby incorporated by reference.

In step 4004, the computer program implementing the system may use geometrical algorithms to determine if the predicted or determined trajectory may result in success or failure.

In step 4005, the computer program implementing the system may use the result of step 4004 to select and virtually insert the appropriate graphic element, animation or video element.

In step 4006, the video may be delivered to the viewer as part of a television broadcast.

Figure 5:
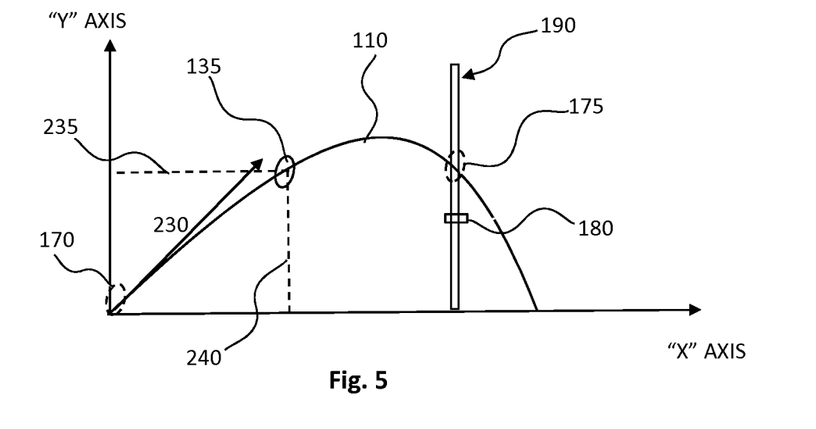
FIG. 5 shows a schematic side-view of a football field goal attempt.
Figure 6:
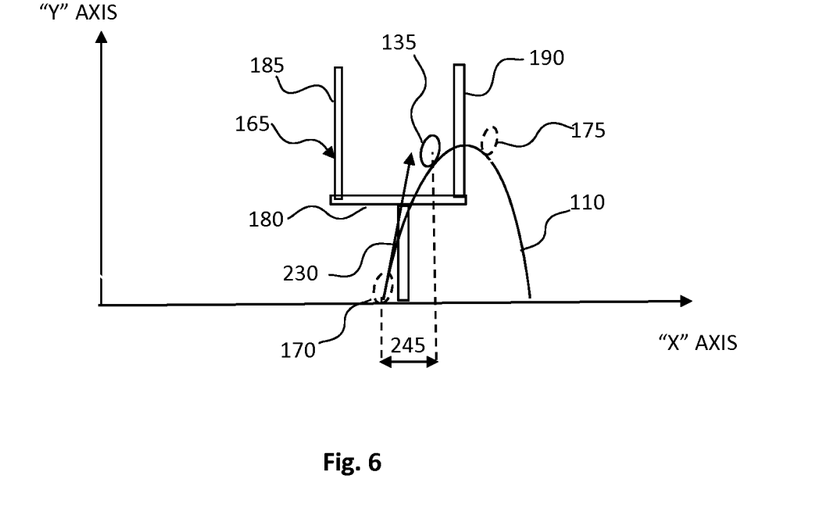
FIG. 6 shows a schematic end-on view of a football field goal attempt.

FIG. 5 shows a schematic side-view of a football field goal attempt and FIG. 6 shows a schematic end-on view of the same attempt.

As shown in FIGS. 5 and 6, when the football is kicked, a force is applied to it that may be described by a single vector 230 that captures the footballs initial motion. After the initial kick, the football is affected only by gravity, air resistance and a prevailing wind, and may follow a path that may approximate a modified parabola.

The football trajectory may, for instance, be described mathematically by the application of Newton's laws of motion, and represented by an equation such as, but not limited to, a vector equation of the form $ma=-mgj-bvv$ where m may represent a mass of the football, a may represent an acceleration vector, g may represent the gravitational constant, v may represent the initial velocity, v may represent unit velocity vector, b may represent a constant representing air resistance and wind direction and j may represent a unit vector in the vertical direction.

A unique solution to such an equation of may be obtained by techniques such as, but not limited to, knowing the mass of the football, the gravitational constant, and by measuring enough factors to provide the remaining unknowns. One of ordinary skill in the art of mathematics will, however, appreciate that such an equation may be solved by measuring the 3 dimensional position of a football after a known time, as may be demonstrated by a suitably programmed applet such as the one supplied by the MIT Mathematics department and currently available at http://math.mit.edu/daimp/FootballTrajectory.html.

The 3-D position of a football may be provided as the x, y and z distances from a fixed reference point. The vector equation above, or other essentially equivalent mathematical representations of the trajectory may, therefore, be solved by, for instance obtaining a single instance of a height 240 of the football, the distance 235 from starting point 170 and the lateral distance 245 from starting point 170 all after the same predetermined elapsed time.

Such a single measurement may be made by a variety of instruments and setups including, but not limited to, using pattern recognition on two cameras mounted so as to provide views of the type shown in FIGS. 5 and 6.

In a further preferred embodiment of the present invention, this may be done using two digital cameras that may, for instance, be still, black and white cameras that may both be timed to take a sequence of simultaneous images after predetermined time intervals. Such data may be readily used by a suitably programmed digital processor to calculate a full trajectory to a reasonable degree of accuracy after even a single set of images, and to a greater degree of accuracy after further sets of images become available.

Although the present invention has been described above, one of ordinary skill in the art will appreciate that the same inventive methods and technologies may be applied to other sports and events in which a trajectory of a game object is the result of a single initial impetus. Suitable events may, for instance, include, but are not limited to, soccer free and goal kicks, rugby kick offs and goal kick attempts. In events such as, but not limited to, soccer kicks, cricket bowling deliveries or tennis shots, in which a skilled player may influence the trajectory by applying spin to the ball as it is struck, an interesting graphic may, for instance, be a comparison of a trajectory predicted absent spin compared to the actual trajectory followed. Such a graphic may, for instance, be indicative of a players skill that may not otherwise be fully appreciated by a less sophisticated views.

Although this invention has been described with a certain degree of particularity, it is to be understood that the present disclosure has been made only by way of illustration and that numerous changes in the details of construction and arrangement of parts may be resorted to without departing from the spirit and the scope of the invention.

INDUSTRIAL APPLICABILITY

The present invention has applicability in the television broadcast industry. In addition, the present invention may have applicability in the film industry.

What is claimed:
1. A method of indicating an outcome of a football field goal attempt in a broadcast video of an event, comprising:
locating a position of a football placement on a playing field relative to a position of a goal post being aimed at;
obtaining, after a predetermined elapsed time after the football is kicked, a three-dimension position of said kicked football relative to said position of football placement on the playing field;

using said single three dimensional position of said kicked football to predict whether not said kicked football will pass through an imaginary success rectangle defined by goal post being aimed at; and if said prediction is indicative of a successful field goal kick, immediately displaying indicia indicative of said success using pattern recognition technology to insert said indicia as a virtual graphic element appearing to be a part of the scene being broadcast.

2. The method of claim 1 wherein said indicia of success is to display said goal posts in a particular color.

3. The method of claim 2 further comprising extending the goal posts.

4. The method of claim 1 wherein said trajectory is calculated using a vector equation: ma=−mgj−bvv where m is the mass of the football, a is the acceleration vector, g is the gravitational constant, v is the initial velocity, v is the unit velocity vector, b is a constant representing air resistance and wind direction and j is the unit vector in the vertical direction.

* * * * *